United States Patent [19]

Maguire, Jr. et al.

[11] Patent Number: 5,331,579

[45] Date of Patent: Jul. 19, 1994

[54] DETERMINISTIC, PROBABILISTIC AND SUBJECTIVE MODELING SYSTEM

[75] Inventors: Harold T. Maguire, Jr., Pittsburgh; John S. Wiesemann, Monroeville; David R. Frost, Plum Borough; Raymond J. Nath, Murrysville; Aristides S. Candris, O'Hara, all of Pa.

[73] Assignee: Westinghouse Electric Corp., Pittsburgh, Pa.

[21] Appl. No.: 43,141

[22] Filed: Apr. 2, 1993

Related U.S. Application Data

[63] Continuation of Ser. No. 388,086, Aug. 2, 1989, abandoned.

[51] Int. Cl.$^5$ ............................................. G06F 15/60
[52] U.S. Cl. ..................................... 364/578; 395/920
[58] Field of Search ...................... 364/578, 488, 512; 395/500, 919, 920

[56] References Cited

U.S. PATENT DOCUMENTS

| | | | |
|---|---|---|---|
| 4,801,421 | 1/1989 | Ackerson et al. | 376/249 |
| 4,965,743 | 10/1990 | Malin et al. | 395/920 |
| 5,016,204 | 5/1991 | Simoudis et al. | 364/578 |

OTHER PUBLICATIONS

Simulation Series; "Intelligent Simulation Environments"; vol. 17, No. 1, Jan. 1986.

*Primary Examiner*—Jack B. Harvey
*Assistant Examiner*—Ellis B. Ramirez
*Attorney, Agent, or Firm*—J. C. Valentine

[57] ABSTRACT

A modeling system that arranges the model in a hierarchical structure of communicating and independently executing object modules controlled by an overall supervisor. Each object represents a component or a system and includes an object controller which communicates with other object modules, an object error checker and an object model. The objects communicate through a database accessible by all objects. The structure of the object module and the hierarchical structure itself are standardized allowing new components or systems to be added by adding a standard object module which includes an object model that is unique to the object being modeled. The controller for an object causes subobjects upon which the object model depends for data to be executed prior to execution of the object model. Such bottom up model traversal insures that models do not execute until all needed data is available. The error check module checks the controller and model modules to make sure they are executing properly. The object model includes a deterministic equation based component aging model, a statistical based component aging model and expert rules that combine the deterministic and statistical model with the knowledge of experts to determine the current state of the object and make recommendations concerning future actions concerning the object. A maintenance module is also included along side the supervisor that allows maintenance actions for the objects to be taken into consideration.

12 Claims, 11 Drawing Sheets

DETERMINISTIC, PROBABILISTIC AND SUBJECTIVE MODELING SYSTEM

This application is a continuation of application Ser. No. 07/388,086, filed Aug. 2, 1989, now abandoned.

BACKGROUND OF THE INVENTION

1. Field Of The Invention

The present invention is a computer-based modeling system designed to improve the overall performance of components and systems that degrade with age. The invention combines expert rules, probabilistic models, and deterministic models to evaluate and predict the effect of component aging on component life extension, operational readiness, maintenance effectiveness, and safety of a system along with evaluating and recommending maintenance and operational actions to improve the overall performance of the modeled system.

2. Description Of The Related Art

Current methods used to obtain, analyze and model complex systems, such as nuclear power plant information, to determine age degradation of the various systems within the complex system are inefficient, time consuming, and many times unreliable. Each component of the plant or complex system is analyzed separately to obtain a numerical indication of its state. The numerical value must then be interpreted by a plant operator to determine the current and potential state of the component. To determine the overall state of the system, each individual component of the system must be analyzed in relation to the other components, for example, the separate parts of a reactor coolant pump must be combined and analyzed together to determine the actual state of the reactor coolant pump. The current methods emphasize the separate components of a system, instead of how and why these components interact.

Many current modeling methods use a deterministic approach which reviews the physical characteristics of a system, for example, temperature, pressure, etc., and evaluates the system solely on the basis of this quantitative information. Other modeling methods use a statistical and probabilistic approach to compare the present state of a component with its past history and to determine what the component and the system might do next. The current modeling methods do not emphasize an heuristic approach to consider the dynamic interaction between the components of a system or between the systems themselves when determining the present and future performance of a plant.

SUMMARY OF THE INVENTION

It is an object of the present invention to provide a system that will combine deterministic, statistical and probabilistic modeling methods with heuristic expert system prediction methods for modeling systems and their components.

It is also an object to provide a system in which new objects (components, systems, etc.) can be added to the system with ease.

It is another object of the present invention to provide a system in which data is shared between object models allowing the state of one object to be communicated to another object.

It is a further object of the present invention to provide a system that accurately and reliably improves the performance of aging systems particularly aging power plants.

It is an additional object of the present invention to reduce or delay the need for replacement of plant components, monitor the effects of aging on plant safety, improve the reliability and availability of the plant, avoid catastrophic plant failures and optimize maintenance and repair of the plant.

The above objects can be attained by a system that arranges the model in a hierarchical structure of communicating object modules controlled by an overall supervisor module. Each object module represents a component or a system and includes an object controller which communicates with other object modules, an object error checker and an object model. The structure of the object module and the hierarchial structure itself are standardized allowing new components or systems to be added by adding a standard object module which includes a unique object model. The object model includes a deterministic equation based component aging model, a statistical based component aging model and expert rules that combine the deterministic and statistical models with the knowledge of experts to determine the current state of the object and make recommendations concerning future actions concerning the object. A maintenance module is also included, along side the supervisor module, that allows maintenance actions for the objects to be taken into consideration.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1A:
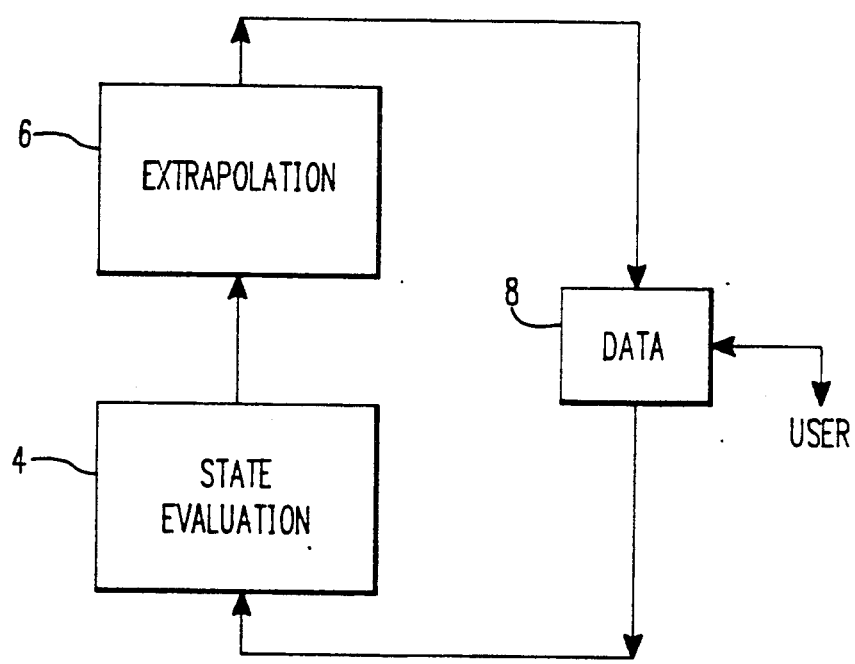
FIG. 1a illustrates how deterministic, probabilistic, statistical and heuristic methods are combined.

The present invention is a modeling system designed to accurately and reliably improve the performance of aging power plants. The system provides a method to evaluate the effects of age degradation on a power plant, before they manifest themselves, and to make recommendations to mitigate these aging effects. The invention is able to anticipate problems before they occur and to make maintenance, testing, replacement, or inspection recommendations through the use of system simulation. The modeling system provides continuous monitoring of both the risk and the probability of failure, and the probable life left of any particular component or system within the plant.

The modeling system of the present invention has a modular and distributed design. It uses an integrated modeling approach by combining the deterministic, statistical, probabilistic and heuristic approaches to problem solving. Integrated modeling provides an accurate and practical measure of the state of a particular component or system. It combines and analyzes all the factors which might affect the component or system under consideration. Because of the distributed modular design, the invention can be used as a generic shell and applied to any component or system within a power plant. To enhance flexibility the system is designed with blank stubs which reserve space in the system for additional modules.

The function of the system is to collect, store, and display data representative of the operating condition of the plant components and systems. The system then calculates the expected life of each component and each system that includes the components. The system can also make recommendations directing the plant operator to perform or to refrain from performing certain procedures. The system is designed to emulate the analytical processes of an engineer. The invention reviews the historical data relating to the component or system, evaluates age degradation and extrapolates into the future to develop a life profile including measures of life left, useful life, etc. The system predicts the life profile of components or systems by considering several factors including maintenance schedules, subcomponent and part quality, personnel availability, and economic resources. A life profile is an indication of the level of performance of a component or system from its installation to the present and through the expected or predicted out-of-service date. The profiles are similar to tracking devices and operate in an iterative fashion and summarize all the substates a component or system passes through, over time, to reach a certain state. The profiles are extremely useful visual tools in determining whether plant safety parameters are being satisfied.

The invention is a combination of the deterministic, statistical, probabilistic and heuristic approaches to problem solving. The deterministic approach models fundamental physical processes of a system to predict behavior for assumed conditions. The statistical and probabilistic approach models the historical behavior of a particular component or system. The heuristic approach is a qualitative, high level approach to problem solving which captures human expertise to model the dynamic interaction of components and systems. By combining these three approaches to problem solving, a realistic and comprehensive picture of the component or system can be obtained. The information thereby provided directly relates to the physical, historical, and actual status of the component or system making it useful and practical to the operator.

The present invention displays and records the evaluated information on a digital display screen. The output can be continuously displayed in analog form, using meters, graphs, and moving displays such as a component life profile graph, for increased user friendliness or simple numbers can be output.

To combine the deterministic, probabilistic, statistical and heuristic approaches the model of each object should be divided into two distinct sections that take advantage of the programming language capabilities of todays languages. One section, as illustrated in FIG. 1a which handles the heuristic determinations and deterministic calculations, is preferably an expert system module 4 that performs state evaluations. This module 4 performs rule based (expert system) determinations and simple calculations to determine the state of the object from all of the variables available which must be evaluated to determine the state. The second section 6 uses deterministic calculations, which can be statistically or probabilistically based, to extrapolate the change in condition of the object during a predetermined interval from the state determined by module 4. Heuristic rules can also be used to choose the deterministic calculations that extrapolate from the determined state to the extrapolated condition. This section 6 is typically implemented in a scientific calculation programming language. The cycle of state evaluation 4 and extrapolation 6 in predetermined time increments continues as the aging of the object is simulated over time. Some of the variables produced by the extrapolation are used in the next state determination. The extrapolation produces data that can be used by other objects, that can be changed by the user to simulate external condition changes and that can be output to be displayed to the user as the simulation progresses. In addition to controlling the sequence of object simulation shown in FIG. 1a, heuristic rules can also be used to determine the interaction of all the objects in the system.

Figure 1B:
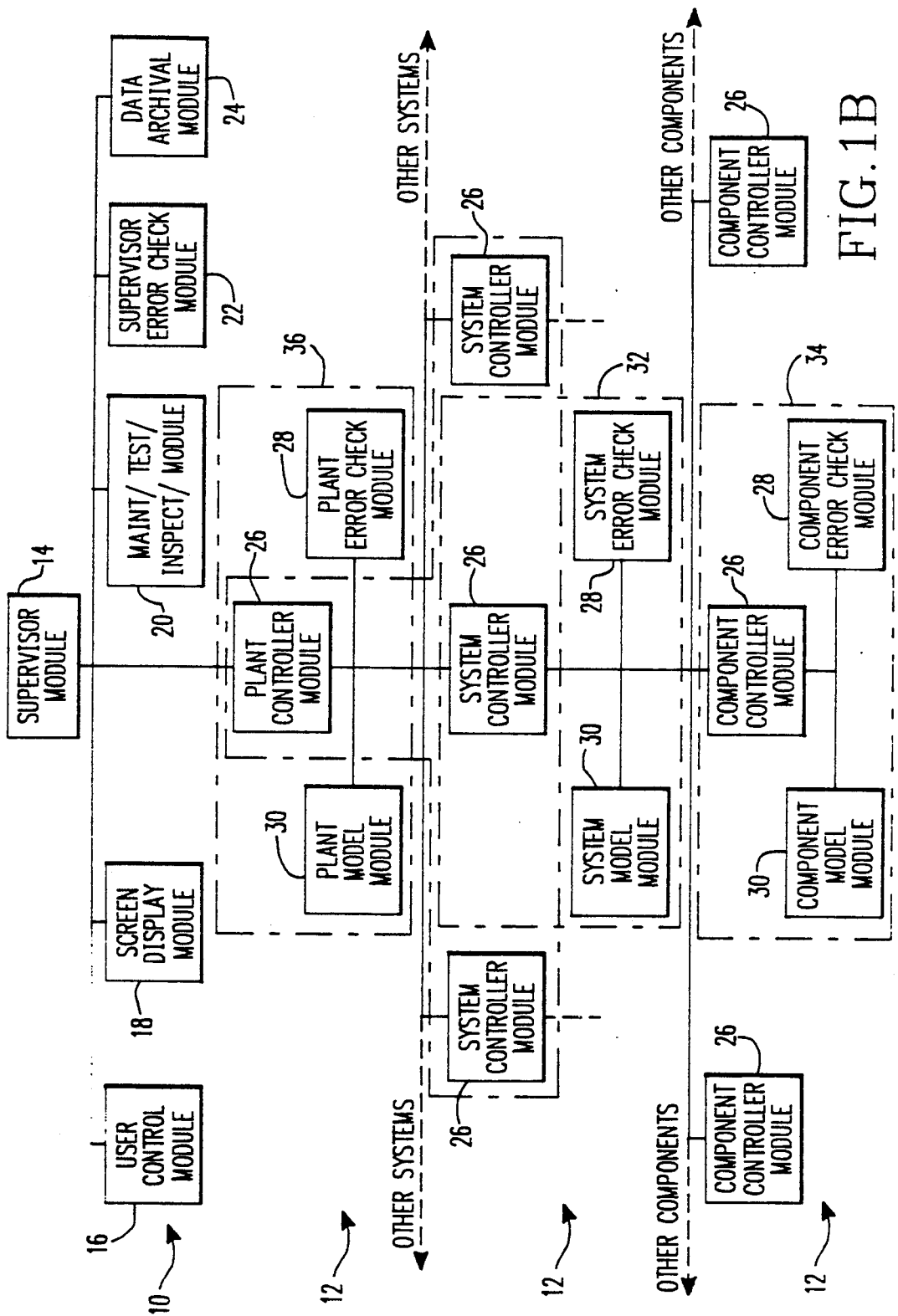
FIG. 1b is system level diagram of the invention.

The computer system has two basic levels, a system level 10 and model levels 12 as illustrated in FIG. 1b. The system level contains supervisor 14, user control 16, screen display 18, maintenance 20, error check 22, and data archive 24 modules. The supervisor module 14 controls the execution sequence of the other modules and initiates execution of the models in the model levels 12. The user control module 16 permits the operator to select the objects modeled, i.e., the components or systems; the profiles, i.e. useful service, safety margin, etc.; and the system parameters, i.e., temperature, pressure, etc., for analysis and display during a particular run. It also provides the operator with the ability to start, stop, pause, save, or restore a particular run. The screen display module 18 accesses and displays the collected data and recommendations of the invention from a common database. The maintenance module 20 makes changes in the model database which simulate component replacement or repair. The supervisor error check module 22 monitors the user control module 16, screen display module 18, the maintenance test and inspection module 20 and the data archive module for errors. The supervisor error check module 22 performs the same functions as other lower level error check modules, as will be discussed in more detail later, and notifies the user module 16 and supervisor 14 when any errors are detected. The ability to access data archives using module 24 gives an operator the flexibility to store result data for selected objects for a particular run, and retrieve the information at a later time. Each object model on each of the model levels 12 contains three object modules designated controller module 26, error check module 28 and model module 30. The controller module 26 determines and controls the processes to be run on each of the systems, components, or subcomponents. The error check module 25 is an independent monitoring module which monitors and scans the system for errors and excessive CPU completion times. It passes the acquired error data to the controller module 26 and the operator. The model module 30 represents the actual system, component, and subcomponent models of the plant. This module 30 takes input data and performs deterministic, probabilistic and expert system functions to provide the various profile data and recommendations.

The invention has the capability of switching analysis from one object to another. Each object has a separate model module for object evaluation and each system in the plant is also represented by an object, that is, the objects represent the system 32 as well as components 34 of the system. Each of the objects relates back to a higher level object as shown by the connection of component object 34 to system object 32 and thereon to plant object 36. The invention uses a standardized modular structure, i.e., the model is divided into a plant level, a systems level, the systems are divided into components, and the components are divided into subcomponents to allow each part of the plant to be analyzed separately and as a part of the whole plant. The modular structure provides the invention with the necessary flexibility and growth potential to allow the continuous expansion of the systems and their components through the addition and replacement of modules. Each object 32, 34 or 36, representing a specific component or system within the plant, also has a standard structure. The modular structure minimizes the need to recompile, retest, and recode information about each component or system.

The information input to the system models includes plant operating characteristics, preventative maintenance schedules, predefined time periods for evaluation, the present state of the equipment, etc.. The information is processed by the system to obtain output values of the life left, the failure probabilities, the useful service, and the life profiles of the systems and components. The invention takes into consideration the increase in the expected life of a plant, produced by replacing and repairing parts, when determining the failure probability of a plant.

Figure 2:
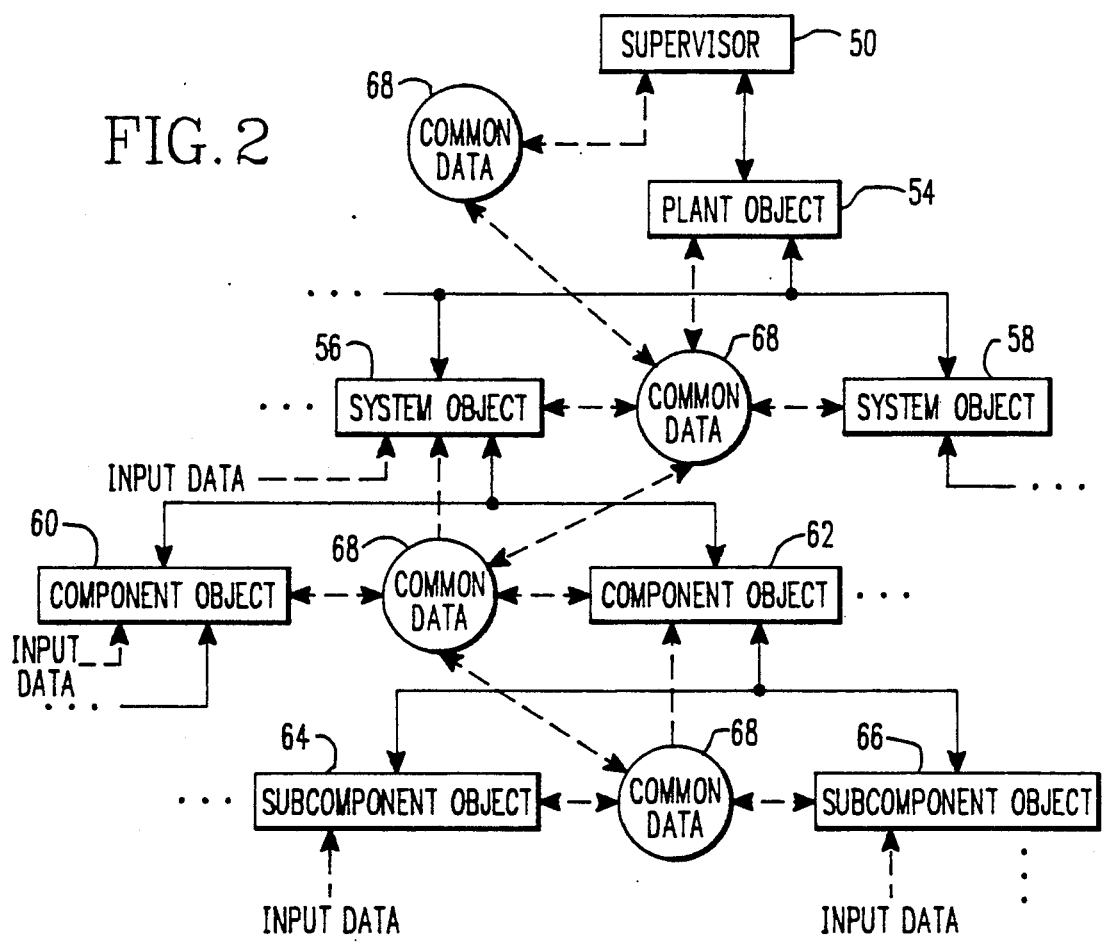
FIG. 2 illustrates the initiation and execution control and data flow in the present invention.

The present invention is preferably implemented in a computer such a Digital Equipment Corporation (DEC) Microvax using an operating system which allows each module in the system to execute as an independent process such as the DEC VMS operating system, where the processes are primarily written in a language such as FORTRAN which will allow easy system control. Each model module 30 is written in an expert system language such as OPS5 which will allow expert rule type determinations to be easily made and which is designed to allow the expert system to call FORTRAN routines to obtain deterministic, probabilistic and statistical model predictions, thereby allowing the model module builder to create expert rules in a language suitable for expert programs and to create prediction equations in a language suitable for such equations. During the model initialization process the supervisor 50, as illustrated in FIG. 2 initiates the plant object 54. The plant object controller within the plant object 54 initiates the model module 30 and error check module 28 in the plant object 54 and then proceeds to initiate any subobjects, for example system objects 56 and 58, which the plant object 54 depends upon for input data. These subobjects are generally system objects 56 and 58 however the subobjects can be component objects. Each subobject such as the system object 56 initiates its own model module and error check module and then proceeds to initiate any subobjects, such as component objects 60 and 62, upon which it depends. These component objects also initiate their own error check and model modules as well as any subcomponent objects 64 and 66. When a lower level object such as object 64 has been initiated it communicates the status of this task completion to the higher level object, such as 62. When all of the objects have been initiated as indicated by each of the subobjects informing a higher level object which informs a further higher level object, the supervisor 50 initiates a simulation cycle. A simulation cycle requires that all lower level objects complete a simulation execution cycle before a higher level object can complete execution. The higher level object initiates the lower level object from a list of objects which it controls. In this way initiation of the object tree is controlled from the top down while actual execution is from the bottom up. To add objects to the system, it is only necessary to add the new object to the objects list contained in the parent object. Input data in the form of component initialization or current state data can be provided individually to each one of the objects, where data flow is illustrated in FIG. 2 by dashed lines, or the input data can be stored in a common data pool 68. Result data produced by an object such as object 64 and 66 is stored in the common data pool 68 where it can be accessed by any object at any level, thereby providing data communication between objects. For example, a subcomponent object may be representing the bearings in a feedwater pump while the component object represents the pump which includes not only the bearings but a drive motor component. By designing the system so that result data is stored in a common data pool 68 new objects and communication pathways between the new objects can be easily created.

Figure 3:
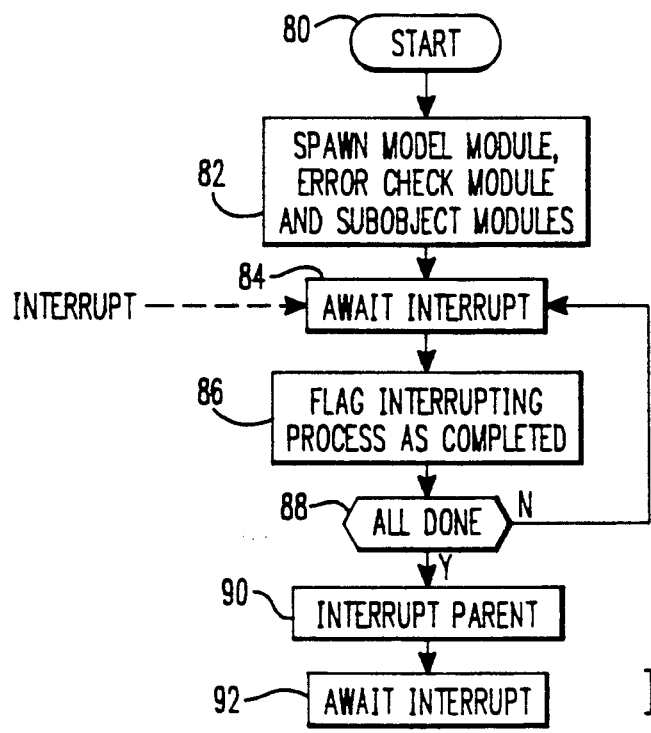
FIG. 3 depicts the initiation routine of each object in the present invention.

The routine within the controller module 26 of each object (32, 34 or 36) which controls initiation of the object and its subobjects is illustrated in FIG. 3. Once the initiation process within the object controller 26 is started 80, it spawns 82 the model module 30, error check module 28 and subobject modules using a list of subobjects on which the object depends for data. For example, the coolant pump object could spawn a coolant pump bearing object, a motor winding object and an impeller object. The spawning process is a conventional process within the VMS operating system and merely requires that a message be transmitted to the operating system requesting that a named process be started. The names of the processes to be spawned are obtained from the list of subobjects. To add a subobject to the objects in a system the name of the subobject only needs to be added to the list in the parent object. The name of each process is a unique identifier which also identifies the data storage area for the process where the data storage area contains initial conditions, the maintenance schedule and stores result data. Once the spawning process is started for all the modules, the initiation routine within the controller 26 awaits interrupts 84 from the processes that have been started. When an interrupt occurs, the process named in the interrupt message is used to access the list of subobject processes and the process providing the interrupt is flagged 86 indicating that it is completed. Next the initiation routine determines 88 whether all of the processes are done, by reviewing the list to see if all subobject initiation flags have been set, if not the process returns to await 84 further interrupts. If the processes are all initiated, the routine interrupts 90 its parent object by sending an initialization complete message, which includes the name of the process that has finished initialization, to the parent object through the operating system in a conventional manner. This interrupt message transmission is followed by the entry into a wait state 92 in which the controller 26 awaits an interrupt requesting a simulation cycle. By initiating all processes as independent processes and placing them in interruptable wait states, the system will only execute those processes that are needed and therefore the execution efficiency of the modeling system is improved because all processes are not active at the same time.

The next step in the simulation process is to run the modeling system based on initial conditions and expected operating conditions for a period of time designated by the user such as forty years which is the typical life of a power plant. During a run various outputs are provided to the user which indicate the state of the components of the plant and any maintenance which is simulated as being performed on the various components. During a model run the user can interrupt execution to change the state of various components, such as indicating complete replacement, so that the effects of unscheduled maintenance can be determined. At the end of a run, the user reviews the various graphs and statistics produced for the various components, such as the remaining life of the plant or the components or the risk of plant or component failure. Once this review is completed, the user can input new initial conditions or new operating conditions or a new maintenance schedule and perform another simulation. In this way, the user can model various maintenance responses to changing plant conditions to optimize a maintenance schedule as well as to enhance the life of the plant. By allowing the user to change initial conditions, the actual state of the plant at the time of the simulation can be incorporated into the model making future projections as accurate as possible at the time of the simulation. Periodic simulations, such as once every month, will allow the user to fine tune maintenance and plant life extension strategies as the plant ages because the initial condition of the components will reflect actual component condition at the monthly simulation times.

Figure 4:
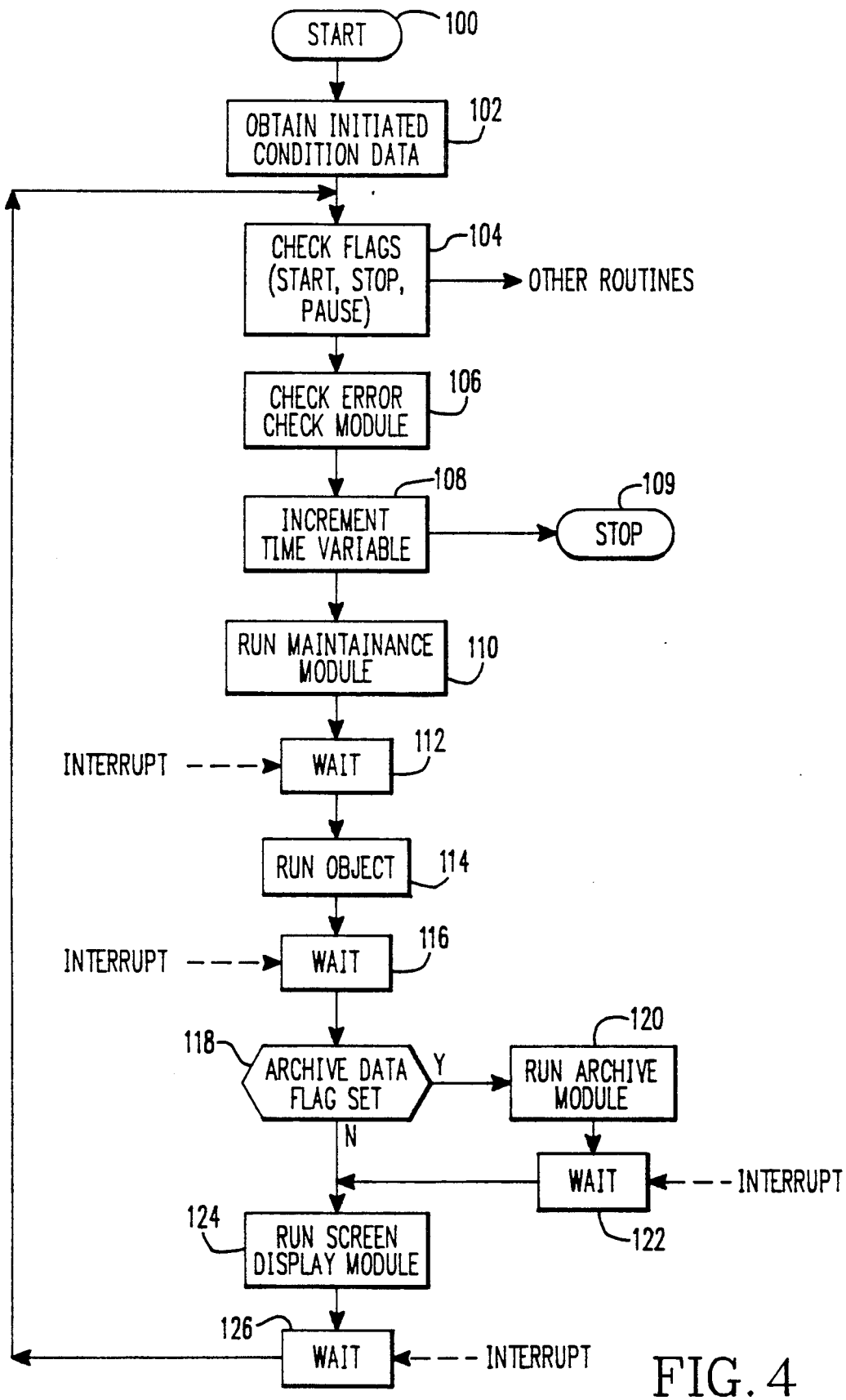
FIG. 4 illustrates the supervisor module 14/50.

At the start 100 of a simulation the supervisor module 14/50, as illustrated in FIG. 4, obtains initial condition data either from a file designated by the user or from initial conditions keyed in by the user. For example, the initial condition data for an oil pump could be (100, 23.3, normal, high, normal, a102, 0, 20000) where, respectively, 100 is pressure in pounds per square inch produced by the pump, 23.3 is temperature in degrees C. of the oil, normal indicates oil flow is in a normal range, high indicates a high corrosive particulate count in the oil, normal indicates normal pump speed, a102 is the model number of the pump, 0 indicates the current time the pump has been running at the beginning of the simulation and 20000 is the maintenance interval for the pump. Of course the order and specifics of the data provided initially will vary depending on the object being modeled, however, variables for the current time and the maintenance interval will always be included. Once the initial conditions are obtained 102 the process checks 104 start, stop, pause and other flags and if one of these flags is set, the process executes an appropriate routine. For example, if the stop flag is detected, the system will stop and permit a data input routine to be executed which will allow the user to change the maintenance data record, thereby interrupting the run to perform an unscheduled maintenance. For example, such a conventional routine would ask the user to identify the object of interest, using the object name the routine would read out the object data in the common data base 68, allow the user to change the data and restore the data to the data base 68. Next the supervisor checks 106 the error check module 22 by examining an indicator (flag) in the common data area 68 which is set by the error check module 22 when a problem has occurred. If this flag is set the supervisor module 14 stops execution and thereby transfers control to a display routine which will provide the user with information concerning the error detected by the error check module 22. Next the supervisor increments 108 the time variable by a predetermined amount. The amount or time increment depends on the physical characteristics of objects being simulated, the maintenance periods of the objects and the desired resolution of the output. With respect to the physical characteristics of the objects, it is preferable that the time increment be shorter than the shortest duration of a physical phenomenon of the objects being simulated. It is also preferable that the time increment be shorter than the shortest maintenance interval otherwise maintenance activities could be skipped. It is also preferable that the time increment be set such that a fine resolution will be obtained so that the results will be more accurate. However, minimizing the time increment increases the run time for a simulation. Since the simulation can be run off line (i.e. not real time), turn around is generally not a problem. For power plants a time increment of 24 hours is preferred. At this step 108 the total elapsed time is also compared to the time set for the simulation and, if the elapsed time is equal to or greater than the set time, the program stops the simulation. Next the maintenance module 20 is executed 110 which will update the mode and state variables of the different objects being modeled in the common data area 68 to indicate that maintenance has occurred, if the time of the simulation is coincident with a scheduled maintenance event. For example, if replacement type maintenance is indicated in the maintenance schedule the remaining life of the component being replaced is set to 100% in the common data area, however, if component refurbishment is performed the remaining life may be set at 80%. Execution of the maintenance module 20 is accomplished by conventionally providing an appropriate message to the operating system directed to awakening the maintenance module. The supervisor then waits 112 for an interrupt from the maintenance module 20 indicating that the maintenance cycle has been completed. Next the supervisor routine 14/50 runs or starts the highest object in the model which is the plant object in the example discussed herein. This is accomplished by providing a conventional message to the operating system specifying the task to be run. Once again the supervisor waits 116 until the object indicates via an interrupt that this simulation cycle has been completed. The process then checks 118 an archive data flag to determine whether it is set and, if so, the archive module 24 is executed 120 followed by a wait 122 for an interrupt indicating that the results of this time increment in the simulation cycle have been stored on an appropriate medium such as a floppy disk. Next the screen display module 18 is executed 124 and the graphs and statistics on the current state of the simulation are provided to the user, after which another wait state 126 is entered. When the wait state 126 from the running of the screen display module 18 is finished, as signified by an interrupt from the screen display module 18, the supervisor process cycles back to perform another time increment of the simulation.

Figure 5:
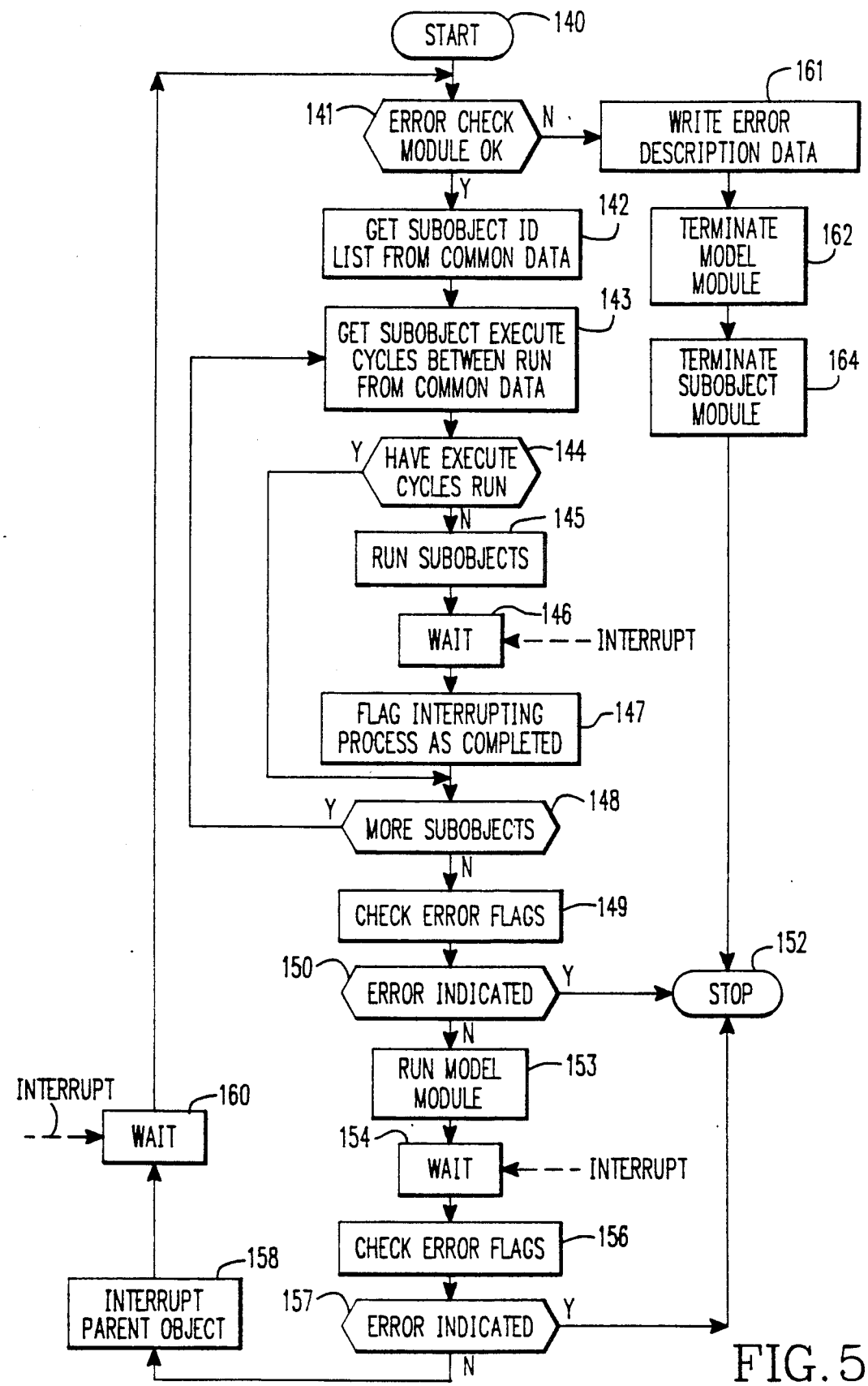
FIG. 5 illustrates the controller module 26 of each object being simulated.

Each object (32, 34 or 36) includes a controller module simulation control routine such as illustrated in FIG. 5. Each controller module 26 is started 140 by the parent process providing a conventional start message to the operating system. The first step by the controller module is the check 141 to determine whether the error check module 28 for the object is executing by examining the status of the error check module 28, continuously updated by the system (VMS). Prior or subsequent to the error check 141, the controller preferably sets an indicator in the common database 68 that indicates that the controller module for this object has started a simulation cycle. It is also possible for this step to store the start time of the cycle. By storing an indicator indicating the start of a simulation cycle and the actual start time, the error check module 28 for the object can determine if the controller is properly executing. The controller 26 next determines which subobjects should be run by examining 142 a list of subobjects from which data is required. This list is preferably an ordered list since a first subobject may produce data that is used by a second subobject. This list can indicate 143 and 144 that a subobject should be run for every time increment, every other time increment or when a predetermined amount of time has passed since the last execution of the subobject. This allows the execution of the subobjects to be tailored to the aging process for the subobjects. For example, if an object such as a turbine rotor blade degrades significantly enough in one year to require a life expectancy determination calculation while the simulation time increment is one day then the object for simulating the turbine blade need only be executed every 365 time increments. As will be discussed later, the user can also limit the objects in a system that are simulated to a desired subset by flagging the objects as not to be executed. For example, if the system includes the entire nuclear power plant and the user only wants to simulate the reactor damping system, only the objects and parent objects related to the reactor damping system are executed. Once the list of subobjects to run is examined and the subobjects are designated, the process runs 145 the subobject one at a time by conventionally providing execution command messages to the operating system allowing processes that need data from another process to run and finish before the needing process is started. The controller module 26 then waits 146 for interrupts from the subobject indicating that they have completed. When an interrupt occurs the process flags 147 an object entry in the subobjects list to indicate the subobject has completed execution. This flagging as complete at step 147 occurs even if the error check module 28 is the module providing the interrupt. As will be discussed in more detail later with respect to FIG. 8, the error check module 28 can provide an interrupt whenever it detects that an error has occurred, even in a subobject, and set an error flag which is acted upon by this controller module (see steps 149 and 150). It is of course possible to provide a check of the error flags immediately after the return from the wait and stop if errors are detected. The system then checks 148 to determine whether more subobjects need to be run and, if so, returns to examine the list again. Once all the subobject processes are completed, the data necessary for the object model is available in the common database 68. When the subobject processes are completed, the error flags for the subprocesses are checked 149 and if an error is indicated the process stops 152. This stop will occur when the error check module 28 has set an error flag even if all subobject return successfully. If no errors are detected, the model module 30 for the object is executed 153 by again providing an execution command to the operating system designating the model module to be executed. The system then waits 154 until the model module 30 has executed. When the object model process 30 is completed, the error flags for the process are checked 156 and, if an error is indicated 157, the process stops 152. An interrupt is provided 158 to the parent object indicating that the object has completed execution. This step also can include a step of setting an error check indicator, indicating that the controller 26 has successfully completed a simulation cycle, and storing a cycle completion time in the common database 68 for review by the error check module 28. The interrupt of the parent is followed by a wait 160 for another execution cycle in the simulation. If the error check module is not executing the controller writes 161 error description data to common storage 68, terminates 162 the model module 30 and error check module 28 by sending an execution stop command to the modules 20 and 30 and terminates the subobject modules in the same way. The display screen module will retrieve the error data and produce an appropriate message.

Figure 6:
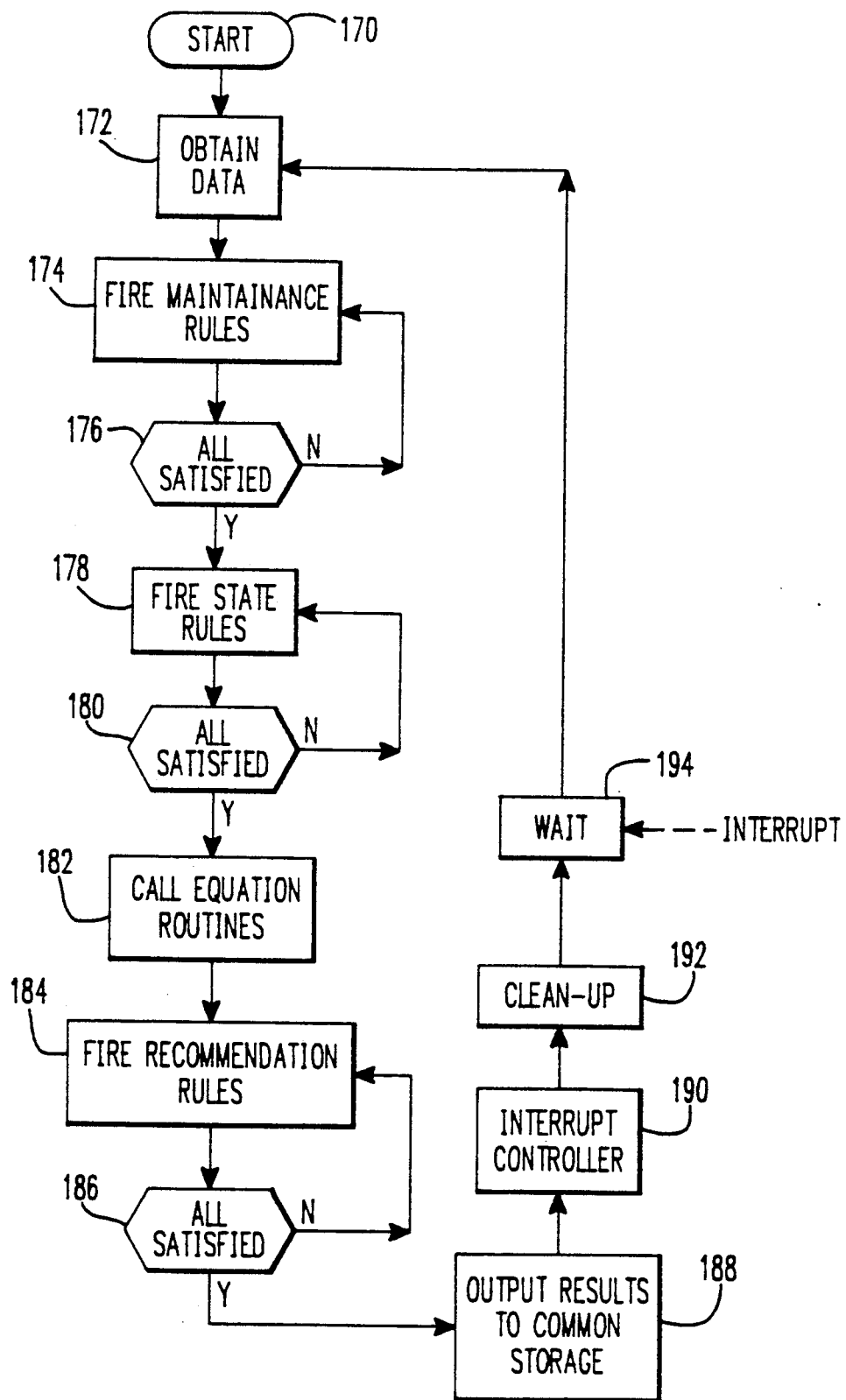
FIG. 6 depicts a model module 30 for each object.

FIG. 6 illustrates the structure and execution of a model module 30 contained within each object. This modeling module 30 is preferably written in an expert system language such as OPS5 with calls to FORTRAN routines for performing equation executions. Appendices A-D have been provided herewith that provide examples of OPS5 modules for a pump model module (appendix A) and a pump shaft model module (appendix B) and FORTRAN routines for performing calculations for components using component equations (appendix C) and subcomponents using subcomponent equations (appendix D) when called by the modules. Even though the controller routine 26 which starts this routine is written preferably in FORTRAN, the start of this routine is handled in the same way by sending a message to the operating system designating the process to be executed. The OPS5 language will execute all the rules in the module at the same time without any distinction in order unless the rules are classified in levels and a level execution order is specified. Since the present invention has a preferred order the first section of OPS5 module includes execution sequence (level) statements which establish the preferred execution order. This order is set forth inherently in the FIG. 6 flowchart. When the controller module 26 of FIG. 5 starts 170 the model module 30 of FIG. 6 the first step by the module is to obtain 172 the needed input data and common data for the module 30. For error detection purposes, the model module 30 at this point can set a process started indicator along with storing the start time as was described with respect to the controller module 26.

Once the housekeeping level rules have completed firing, the system fires maintenance rules to perform any maintenance on the object which is specified by the maintenance schedule. For example, the maintenance rules can review the maintenance schedule in the common database 68 and determine that an inspection discovered premature degradation of the oil lubricating a turbine and thus reduce the useful life by 20% and change the degradation constants in the degradation equation to simulate faster degradation of the oil. Appendices A and B include examples of maintenance rules for a pump and a pump shaft. For example, consider a pump shaft and the bearing for that shaft. At a point during a simulation the state of the bearing and shaft are determined. The states are extrapolated using the bearing and shaft life equations to be discussed in more detail later. Assume that the next state determination indicates the bearing is bad and that maintenance is not scheduled until some time later. As a result, the bearing will remain bad until it is replaced. The shaft rules have an input that considers bearing quality, now bad, and will determine that the wear rate on the shaft is now high. If the bearing is replaced, the age of the bearing as set to zero and the condition set to good and the rules determine that the state of the bearing is good. During the interval between the bearing going bad and being replaced the shaft is wearing at an accelerated rate. When the bearing is replaced the shaft rules will determine that the shaft wear rate is normal, unless too much time has passed and the shaft has been declared bad or other effects which prevent a normal shaft condition are created by other components. It is possible that the accelerated aging of the shaft will cause the shaft to go bad before the shaft scheduled maintenance and if this happens the bad shaft will affect other components or the entire pump.

The failure of the bearing before the scheduled maintenance acts as a recommendation that the bearing be replaced in the immediately preceding scheduled maintenance outage. In this situation there is always a concern about the accuracy of the prediction and the inherent recommendation made by the prediction of a failure. The level of accuracy required in a nuclear power plant is bound by the time window defined by refueling outages. This is approximately 1 to 1.5 years. In such a plant it is preferable that all maintenance be performed during the scheduled outages versus bring the plant down for an unscheduled or forced outage due to the unexpected failure of a system or component or due to the need to perform preventive or corrective maintenance. In such a situation the present invention is required to predict between which outages an object will likely fail or require maintenance rather than determine the exact date of failure. The system does attempt to accurately predict the actual date of failure, however, the accuracy depends on the accuracy of the object model and the accuracy of the data concerning initial conditions. The determination of when to take action is left for the user to decide. The present invention will tell the user the last possible date on which to perform maintenance to avoid a failure. This date will be before the failure is actually expected to occur. The user would normally be expected to perform the recommended maintenance activity at the outage prior to the predicted failure.

The firing of maintenance rules is continuously executed until all are satisfied 176 after which state determination rules 178 are fired. An example of several state determination rules which not only require input data directly but data previously produced by a subobject are illustrated in appendices A and B.

Once all the state determination rules are satisfied 180 the model module starts or calls 182 FORTRAN equation routines which performs the deterministic, and/or statistically based, and probabilistic calculations to simulate the changes in the state of the object required for the current time period. The calling of the FORTRAN routines is performed by a standard call statement in OPS5 such as CALL AGEROUTINE $<V17><V2$-$7><V37>$ which will call an age routine that needs variables V1–V3. Of course the routine must be compiled and linked with the program. The passing of variables down to a FORTRAN routine by an OPS5 routine is accomplished using variables. However, passing variables up to an OPS5 routine by a FORTRAN routine requires creating and using working memory elements or variables within the calling routine. Examples of this are shown in the appendices. An example of equations which uses not only input data directly provided to the object but also input data provided by the subobjects to determine the life of an object and the risk of failure of the object are illustrated in appendices C and D. Once the simulation of a change in state of the component for the current time period has occurred the module fires 184 recommendation rules which provide maintenance recommendations to the user. In effect the model module performs diagnostics to determine if any of a list of recommendations should be issued. The maintenance module issues confirmations of the completion of maintenance activity. In both situations the text is stored in the common storage 68 and the display module subsequently accesses and displays the text. Examples of recommendation rules for a pump and a shaft are illustrated in the appendices.

Once all the recommendation rules are satisfied 186 the results are output 188 to common storage 68 followed by an interrupt being transmitted 190 to the controller for the object. The results of a single cycle of the simulation are used as the initial conditions of the next cycle. This particularly is applicable to time related data. However, as the simulation progresses these variables can be modified by the user or other external data. For example, the time increment can be changed during a simulation to provide a period of higher or lower resolution allowing the simulation to skip over less interesting events and simulate interesting events in great detail. An example of other data from external sources which is not carried from cycle to cycle is maintenance schedules.

The routine then performs appropriate housekeeping and clean up duties 182 such as setting variables to initial values and then waits 194 for an interrupt from the associated controller. This housekeeping also includes setting a process finished indicator and the completion time for analysis by the error check module. When an interrupt occurs the execution cycle starts again.

Figure 7:
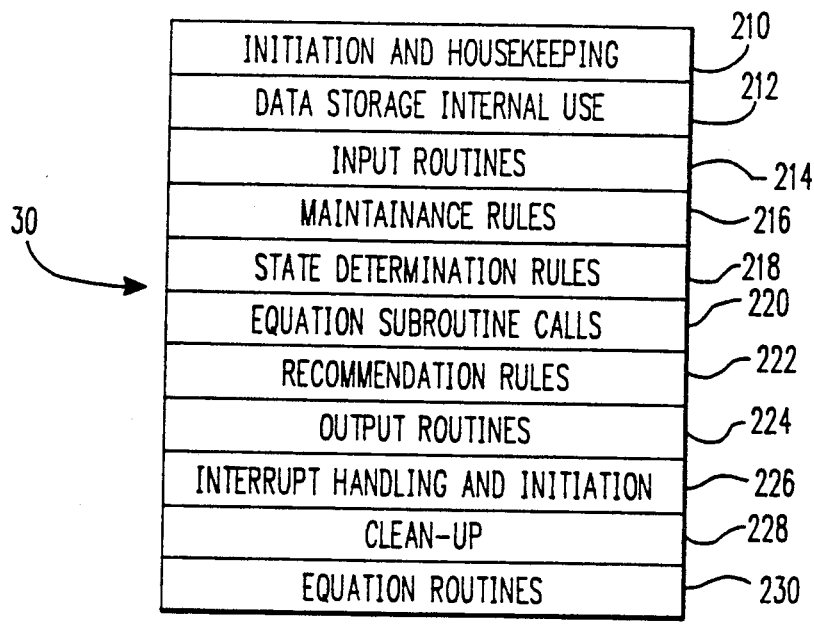
FIG. 7 shows a preferred arrangement for a model module 30.

To enhance the modularity of the present invention the model module 30 is preferably organized in distinct separate sections which will allow a standard model module template to be easily updated for any new objects that need to be added to the system. A preferred arrangement for the standardized model module is illustrated in FIG. 7. The preferred arrangement includes initiation and housekeeping and execution sequence rules at the beginning followed by internal data storage areas 212 with input routine rules 214. Next, maintenance 216 and state determination 218 rules follow, while equation routine calls 220 follow the state determination rules. Next recommendation rules 222 are followed by output routines 224. All interrupt handling and initiation rules are grouped together followed by cleanup type housekeeping 228. Next come the equation subroutines 230 which are called by the calls 220.

The rules and equations as discussed above for objects other than a pump and a shaft can be developed by a component engineer of ordinary skill who is familiar with the object being modeled. As an alternative an ordinarily skilled knowledge engineer could query the component engineer and develop the rules and equations. A standardized arrangement such as illustrated in FIG. 7 will enhance the ability of the present invention to expand and handle any desired number of objects in a system being modeled. To further enhance modularity the common data area 68 is also organized in a modular way. Preferably each object is provided a fixed size initial conditions and operating parameters data storage area within the common data storage 68. Within the storage area predefined storage areas which have associated variable names. For example, a storage area for the useful service remaining for a shaft would be preserved and given a name such as Shaft-Useful Service. By scanning the variable names a desired data storage area for an object can be found. By providing the common data storage area with fixed size object storage areas, loading the data into arrays which will increase operating speed is facilitated.

Figure 8:
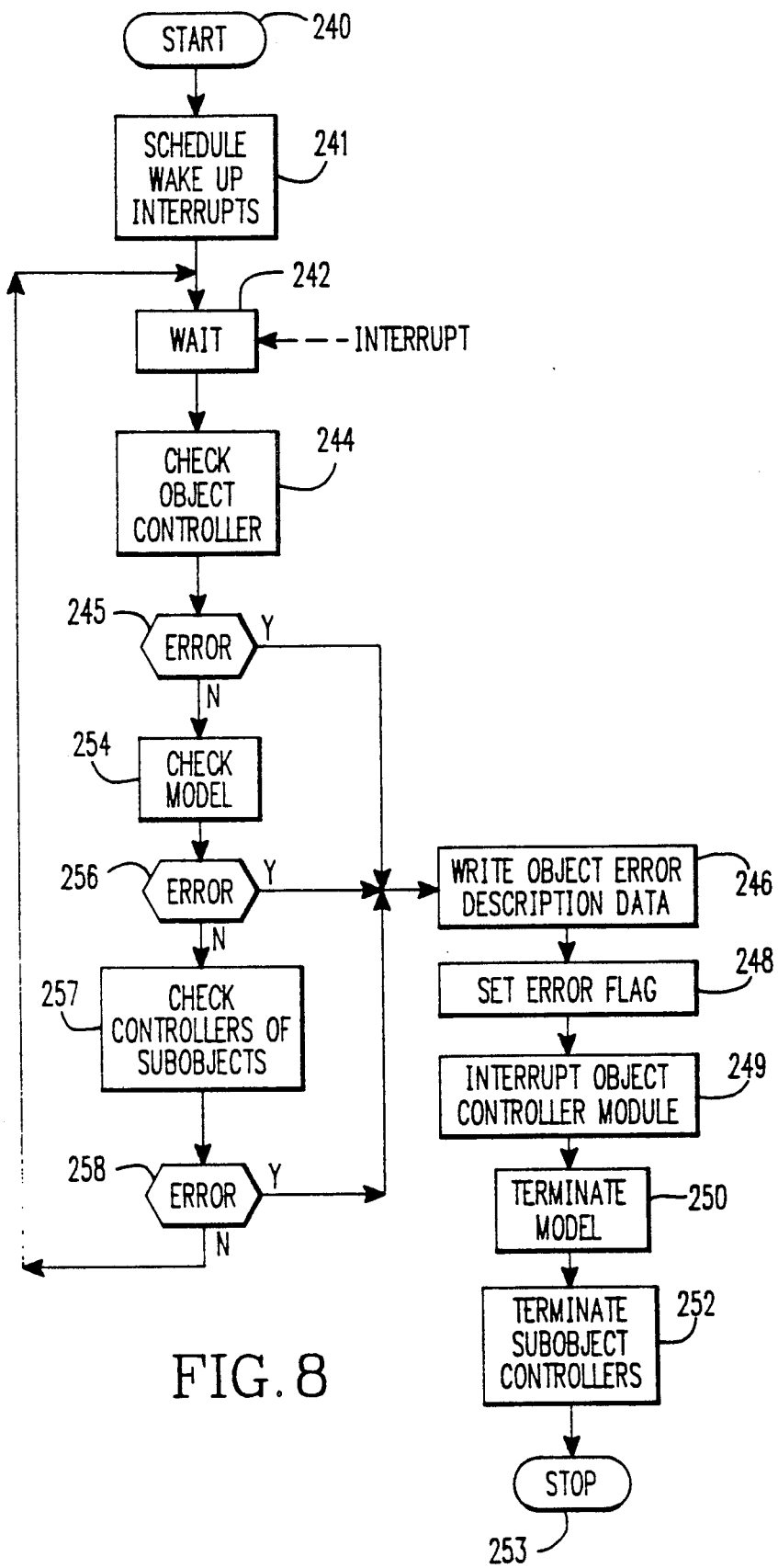
FIG. 8 illustrates the operation of the error check module 28.

The error check module 28 in each object is illustrated in FIG. 8. The goal of the error checking routine is to determine whether the various modules which interact with the object and upon which the object depends are properly executing. During the initial cycle of the error check routine, that is, after execution has been started 240 by the routine of FIG. 3, the error check module 28 schedules 241 timed wake up interrupts for interrupts at specified real times. For example, an interrupt every ten seconds. The process then enters a wait state 242 waiting for these interrupts.

Once an interrupt occurs the process checks 244 the controller. This check is performed by checking the started and finished process indicators for the object controller and determining the elapsed time for the started controller process. If the time of execution for the controller module is beyond a predetermined amount this indicates that the module is stuck in a loop or that an object process which the controller is waiting on is stuck. This is an error. Another type of error is a condition where the controller module has not executed within a predetermined time from the start of a simulation. If an error has occurred 245, the module 28 writes appropriate error condition description data into common storage 68. The display module 18 will later retrieve this information and produce a message describing the error On the display screen. Next the error checker 28 sets 248 the error flag and then interrupts 249 the object control module 26 when interrupted, as illustrated in FIG. 5, the module 26, will check the error flag and terminate itself. After interrupting module 26, the error check module 28 terminates the model and subobject controllers and itself 253. Next the routine performs the same sort of check on the model module 30 and if there is an error 256 notifies the controller in the manner previously discussed. Next the routine checks 257 the controllers of the subobjects which are being controlled by the object controller by accessing the list of executing processes designated by the object controller. Once again, if an error is detected 258 the controller 26 is notified.

Figure 9:
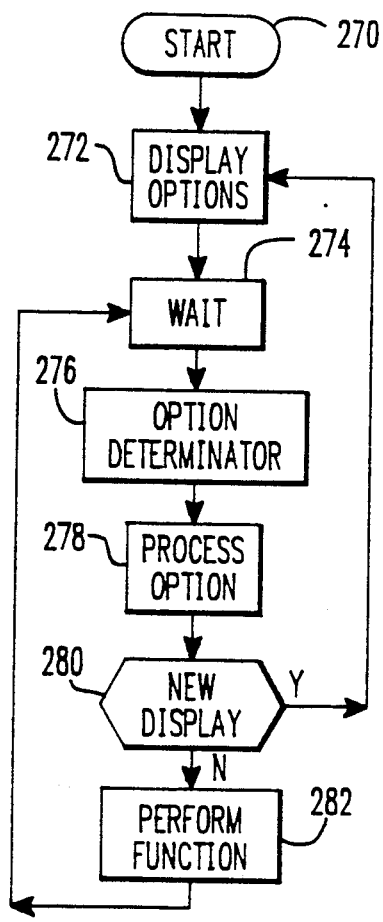
FIG. 9 depicts the user control module 16.

The user control routine 16 allows the user to set initial conditions, change maintenance schedules, interrupt the simulation and perform unscheduled maintenance and select which objects are to be simulated in a run, and the operation of this routine is depicted FIG. 9. Once this routine is started by the user the user is provided a display 272 of available options followed by entry of the routine into a wait state 274 where the process waits for an option selection. When the interrupt is exited an option determination 276 is performed followed by processing of the option. For example, if the option selected by the user is to update maintenance data, the processing of the option would retrieve the maintenance file and allow the user to change the contents of the maintenance file. If the user selects an option for designating a subset of the objects in the system to be simulated, the common database 68 is scanned to determine the names of the objects available from the tags in the database. The list of objects is provided to the user and the user marks those for which a simulation is required. The list must include the desired target object and all associated parents up to and including the supervisor module 14. For example, if the turbine pump object is the object of simulation interest, it is marked as one of the objects. The list of objects to be run must also include the turbine object of which the pump is a subobject, the plant object of which the turbine is a subobject and the supervisor. If the plant object also has as subobjects the generator, the boiler and the power distribution systems, these systems would not be marked for execution. Each object examines uses this list as previously discussed with respect to FIG. 5. The objects then uses this flagged list to decide whether they should execute as previously mentioned. The user can also be given the option to select various modes of outputting the results such as producing displays that show the life profile, safety margin, trip margin, expected life, wear rate maintenance and elapsed simulation time when for example simulating components of a nuclear power plant. Once this option is processed the user is given the option to select a new display 280 and, if no new displays are selected, any functions selected by the user are performed. For example, the user could stop an execution, change the maintenance data and request a simulation from the original initial conditions. The functions performed would then be updating of the maintenance data and initiation of a simulation.

Figure 10:
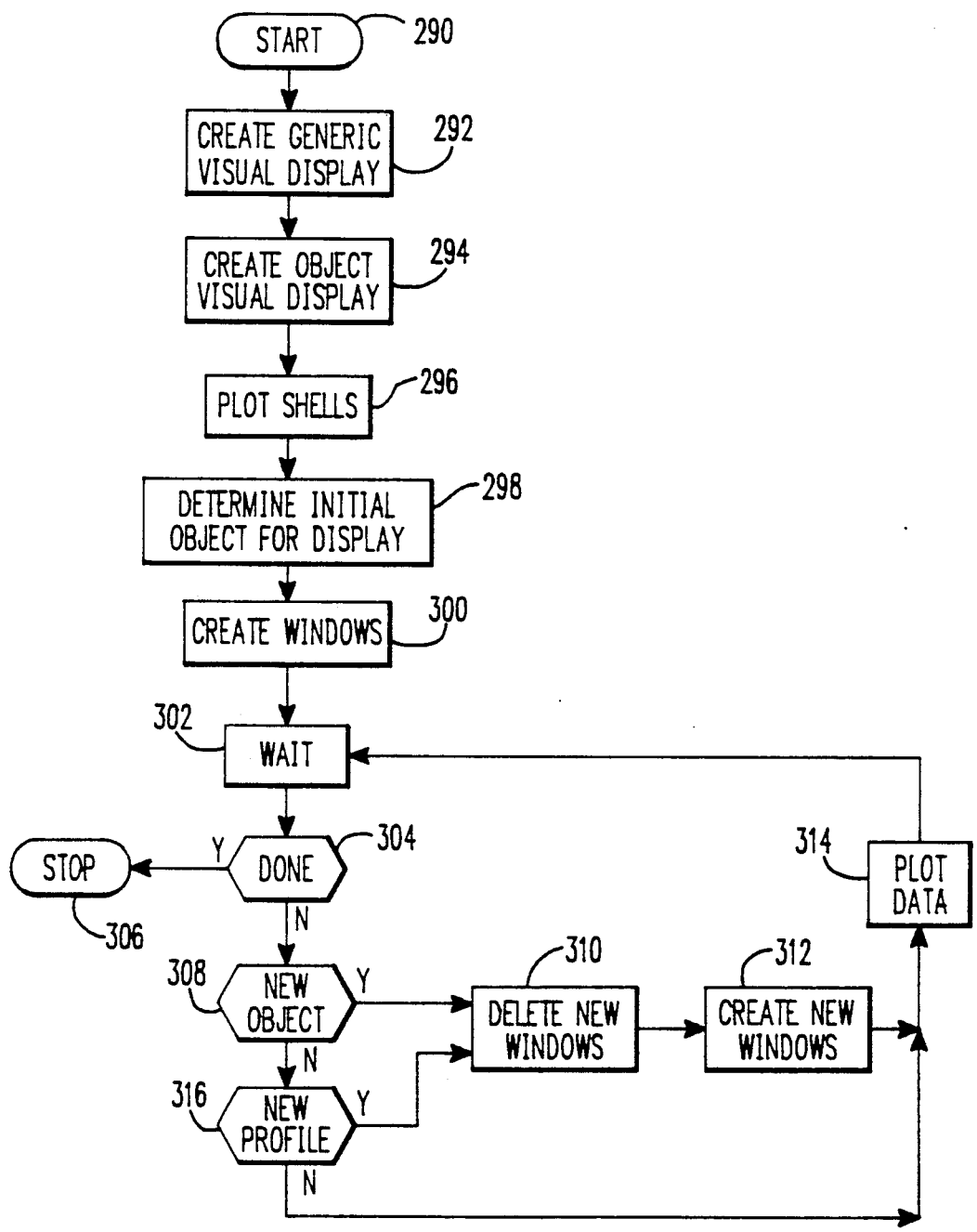
FIG. 10 illustrates the screen display module 18.

The screen display routine 18 illustrated in FIG. 10 performs conventional display functions using conventional virtual display techniques. During the first cycle of the screen display module, a generic display for the entire system is created 292 along with virtual object displays 294. The system also creates graphic shells for plotting the results and then, based on user input, determines which initial object will be displayed. For example, the user can specify, during the user control module 16 execution, that only the water chemical make-up system is to be simulated and that only the life profile of a boron concentration analyzer is to be displayed. From this determination appropriate windows into the virtual display are designated 300 and the user is provided with an appropriate display. The system then enters a wait state 302 waiting for the supervisor to indicate that a simulation time increment has been completed. When an interrupt occurs the system determines 304 whether the simulation is finished, if so the system stops 306. If the user wishes to display a new object, then the old windows are deleted 310 followed by the creation of new windows and plotting 314 of the output result data for the object windows. If a new object is not desired, a determination is made as to whether a new profile of the objects is desired and, if so, the windows are again deleted and new ones created.

Figure 11:
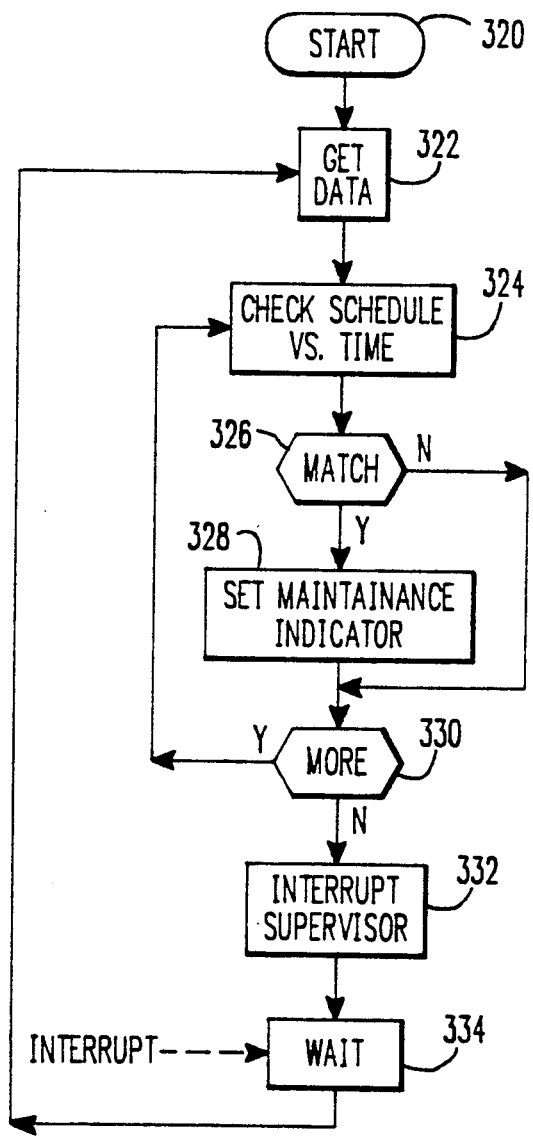
FIG. 11 shows the function of the maintenance module 20.

The maintenance module 20 illustrated in FIG. 11 starts by obtaining 322 the maintenance schedule from the common database 68. Preferably, the maintenance schedule for each object is stored in the dedicated storage area for the input data and output results for the object previously mentioned. The schedule is compared with the current simulated time for each object on the list. If there is a match 326 for a particular object the maintenance indicator for that object is set so that the maintenance rules in the object can perform the appropriate maintenance. For example, the maintenance indicator can indicate complete replacement of the object, rebuilding or repair or refurbishment of the object and for each one of these different types of maintenance, a different improvement in component life expectancy, reliability, etc. is caused. If all the objects of the maintenance schedule have not been compared to the current time the routine returns for more comparisons. When all the comparisons have been completed the supervisor 14/50 is interrupted allowing the supervisor to initiate a new simulation run. Once the supervisor is interrupted the process waits 334 for an interrupt from the supervisor indicating another maintenance cycle is necessary.

Figure 12:
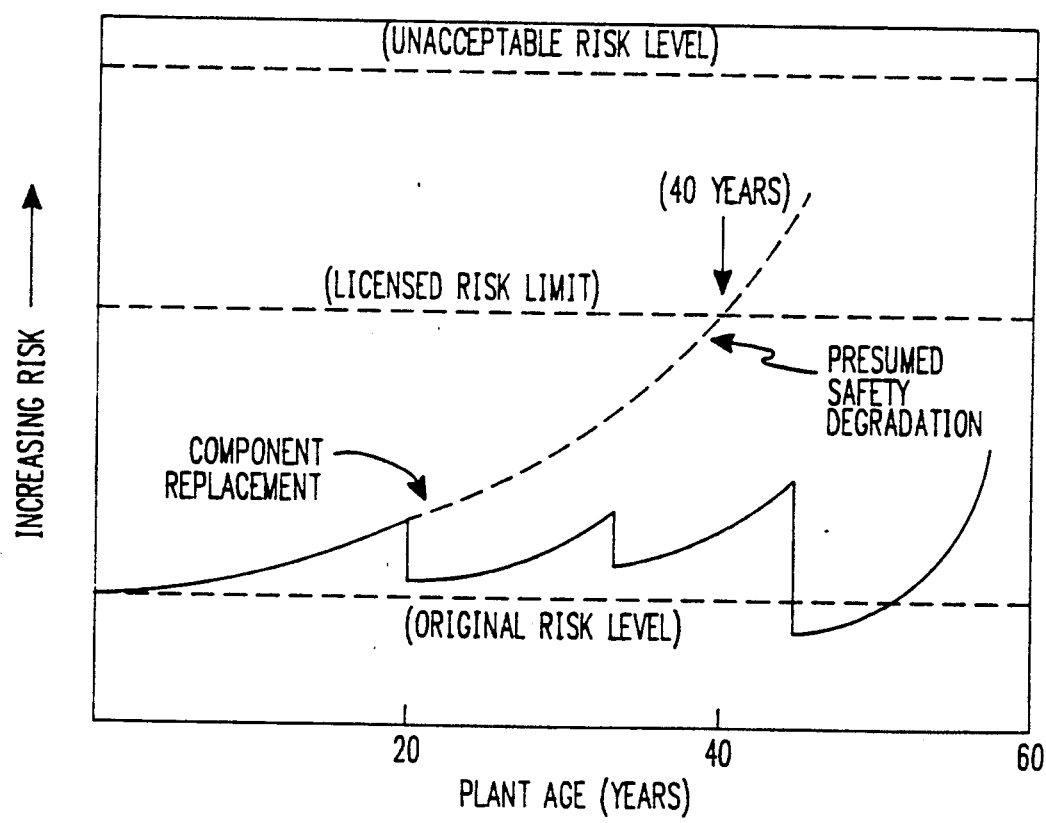
FIGS. 12 and 13 are examples of displays provided during a simulation.
Figure 13:
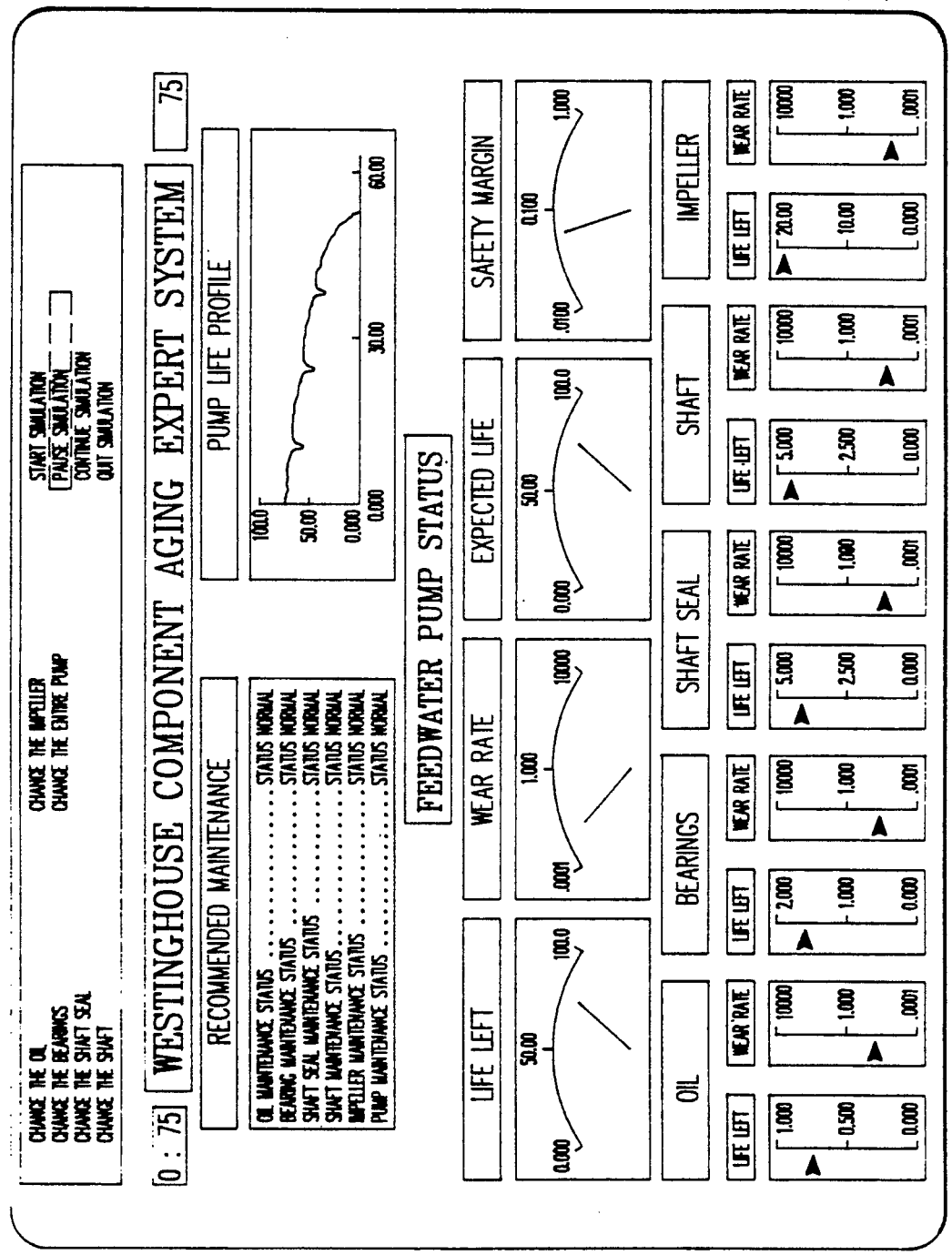

The system can provide various types of displays as illustrated in FIGS. 12 and 13. The display of FIG. 12 shows the profile for changes in risk level in a plant from a situation where no maintenance is performed and a situation where maintenance is performed three times on the components of the system. This type of display will allow the user to very effectively determine the cost risk ratio associated with various maintenance plans. FIG. 13 shows the life profile, wear rate, expected life and safety margin of for a pump along with the life left and wear rate of the components which make up a pump.

The present invention provides the capability to optimize plant operations, safety, and performance. It provides the capability to perform analyses of the different systems and components by varying operating modes and conditions, safety and trip goals, maintenance and part quality, and scheduled maintenance, replacement, test, and inspection intervals. The analysis allows a prediction about the affect on safety, performance, and life extension. The invention enables the optimal maintenance, replacement, test, and inspection intervals for the various systems within the plant to be determined. The overall benefits of the invention when applied to a power plant system include reduced forced outages, improved safety, reduced outage durations, and improved planning.

Currently, to change operating conditions during a simulation the following steps are taken. First a set of operating conditions that the system will access during the simulation is created. The simulation is started and paused at the point in the simulation when a change in operating conditions is desired. The operating condition data is then replaced or updated and the simulation is continued. It is possible to have the databases used during the simulation to be automatically switched. This could be accomplished by having an operating conditions schedule that is checked at the same time the maintenance schedule is checked. This schedule could be used to load in a designated new operating conditions database.

As previously mentioned, blank stubs are provided in the system to reserve space in the system for additional modules. A blank stub has all the basic input/output variables and declarations necessary to provide the minimum processing or calculations necessary to return any processed data to the calling program in which the stubs are inserted. For example a system level module can be created having a model of a pump, piping and valves. By providing blank stubs in the system level model the system can be exercised and tested because the blank stubs provide return valves where the pump, piping and valve modules will reside. The stubs may simply accept and return fixed data, thereby emulating all processing by and communications to and from the stubs. For example, a subprocess stub, as represented in pseudo code, could be:

```
Sub-Process Valve
Get all data from calling process
Add 1 to all data
Return Data
End Sub-Process Valve
```

A model stub, as represented in pseudo code could be:

```
Sub-Process Valve
Get all data from calling process
Pressure = log (T + P)/g
Call (Subroutine A, B, C)
Add 5 to all temperature data
Flow = Flow + % Open
Return Data
End Sub-Process Valve
```

This stub would calculate a pressure from the variables that determine pressure in a valve, call a subroutine that typically calculates life of the valve, add 5° to the temperature data for the valve and increase the flow by the percent the valve is open. The stub would thereby provide varying data for all parameters of a valve.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A modeling system, comprising:
    a computer, comprising:
        supervisory means for performing supervisory functions of the system;
        object means for modeling objects in the system responsive to a simulation cycle initiated by said supervisory means, said object means comprising object models where each object model comprises modeling means for deterministically, probabilistically and heuristically modeling the object and producing object expected life state information over a simulated passage of future time including multiple time points of the future time; and
    a display connected to said computer and displaying the state information.

2. A system as recited in claim 1, further comprising a common database to which all object models have access.

3. A system as recited in claim 2, wherein said modeling means comprises:
   expert maintenance determination means for changing the state of the object responsive to maintenance inputs;
   expert state determination means for determining a current state of the object;
   state change equation means for determining the change of state of an object from the current state; and
   expert recommendation means for providing recommendations for state changes.

4. A system as recited in claim 3, wherein said object models are arranged in a hierarchy requiring execution completion of lower levels of the hierarchy before upper levels can complete execution.

5. A system as recited in claim 4, wherein an upper level object model controls a lower level object model execution sequence.

6. A system as recited in claim 5, wherein each object model further comprises:
   controlling means for performing execution control functions for the object; and
   error determination means for determining whether the object model is functioning correctly.

7. A system as recited in claim 5, wherein said supervisory means, said controlling means, said error determination means and said modeling means are independently executing processes.

8. A system as recited in claim 5, wherein said controlling means includes an execution sequence ordered list of lower level object models.

9. A system as recited in claim 6, wherein a user designates a subset of said hierarchy and said controlling means controls execution responsive to the subset.

10. A modeling system, comprising:
    a computer system, including:
      supervisory means for performing system supervision;
      a common database accessible by said supervisory means; and
      a hierarchical object model tree having object models executing bottom to top and each of said models comprising:
        modeling means for modeling a corresponding object and including:
          expert maintenance means for changing, over a simulated passage of future time including multiple time points of the future time, one of a current and future states of the corresponding object responsive to a maintenance schedule;
          expert state determination means for determining the current state of the corresponding object;
          state change equations for determining the future states of the object from the current state; and
          expert recommendation means for providing recommendations for state changes;
        controlling means for initiating an ordered execution of objects lower in the hierarchy prior to initiating execution of said modeling means; and
        error determination means for determining whether said modeling means and said controlling means are executing; and
    a display connected to said computer and displaying the current state, the future states and the recommendations over the simulated passage of the future time including the multiple time points of the future time.

11. A modeling system apparatus, comprising:
    supervisory means for performing supervisory functions of the system;
    object means for modeling objects in the system responsive to a simulation cycle initiated by said supervisory means, said object means comprising object models performing feedback of object state information over a simulated passage future of time, where each object model comprises modeling means for deterministically, probabilistically and heuristically modeling the object and producing object expected life state information over the simulated passage of the future time including multiple time points of the future time; and
    display means for displaying the expected life state information.

12. A modeling system apparatus, comprising:
    supervisory means for performing system supervision;
    a common database accessible by said supervisory means;
    a hierarchical object model tree having object models executing bottom to top and each of said models comprising:
      modeling means for modeling a corresponding object by performing feedback of object state information over a simulated passage of future time and including:
        expert maintenance means for changing, over the simulated passage of future time including multiple points of the future time, one of a current and future states of the corresponding object responsive to a maintenance schedule;
        expert state determination means for determining the current state of the corresponding object;
        state change equations for determining the future states of the object from the current state; and
        expert recommendation means for providing recommendations for state changes;
      controlling means for initiating an ordered execution of objects lower in the hierarchy prior to initiating execution of said modeling means; and
      error determination means for determining whether said modeling means and said controlling means are executing; and
    display means for displaying the current state, the future states and the recommendations over the simulated passage of the future time including the multiple points of the future time.

* * * * *